US011443565B2

(12) United States Patent
Kawase

(10) Patent No.: US 11,443,565 B2
(45) Date of Patent: Sep. 13, 2022

(54) WATERCRAFT, WATERCRAFT INFORMATION SYSTEM, AND INFORMATION COMMUNICATION METHOD OF WATERCRAFT

(71) Applicant: YAMAHA HATSUDOKI KABUSHIKI KAISHA, Iwata (JP)

(72) Inventor: Koji Kawase, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 526 days.

(21) Appl. No.: 16/368,910

(22) Filed: Mar. 29, 2019

(65) Prior Publication Data

US 2019/0311553 A1 Oct. 10, 2019

(30) Foreign Application Priority Data

Apr. 4, 2018 (JP) ............................ JP2018-072026

(51) Int. Cl.

| | |
|---|---|
| ***G01M 17/00*** | (2006.01) |
| ***G06F 7/00*** | (2006.01) |
| ***G06F 19/00*** | (2018.01) |
| ***G07C 5/00*** | (2006.01) |
| ***B63J 99/00*** | (2009.01) |
| ***G07C 5/08*** | (2006.01) |
| ***B63B 79/10*** | (2020.01) |

(52) U.S. Cl.

CPC .............. *G07C 5/008* (2013.01); *B63B 79/10* (2020.01); *B63J 99/00* (2013.01); *G07C 5/0808* (2013.01)

(58) Field of Classification Search

CPC ...... G07C 5/008; G07C 5/0808; B63B 79/10; B63J 99/00

USPC ........................................................ 701/34.2

See application file for complete search history.

(56) References Cited

U.S. PATENT DOCUMENTS

2003/0061076 A1* 3/2003 Okuyama .............. G06Q 10/06 705/4
2003/0074114 A1* 4/2003 Okuyama .............. G05B 17/02 701/21
2008/0319665 A1* 12/2008 Berkobin ............... G07C 5/085 701/469
2013/0281067 A1* 10/2013 Takizawa .......... H04M 1/72412 455/414.1
2014/0266809 A1* 9/2014 Rothrauff, Jr. ...... F41H 13/0081 340/984
2019/0266029 A1* 8/2019 Sathyanarayana ...... G06F 9/542

FOREIGN PATENT DOCUMENTS

JP 3949414 B2 7/2007

* cited by examiner

*Primary Examiner* — Mahmoud S Ismail

(74) *Attorney, Agent, or Firm* — Keating and Bennett, LLP

(57) ABSTRACT

A watercraft includes an information acquirer and a controller. The controller starts data transmission when a communication start condition based on at least one of a reception strength of a radio wave received by a communication terminal from a base station, a rotation speed of an engine, a traveling speed of a hull, and a state of a shift device is satisfied, and does not start the data transmission when the communication start condition is not satisfied.

20 Claims, 11 Drawing Sheets

71

| ω[rpm] | S |
|---|---|
| ωa | S1 |
| ω1 | S2 |
| ω2 | S3 |
| ω3 | S4 |
| ω4 | S5 |

72

| ω[rpm] | S |
|---|---|
| ωa | S1 |
| ω1 | S1 |
| ω2 | S2 |
| ω3 | S2 |
| ω4 | S2 |

271

| V[m/s] | S |
|---|---|
| V1 | S1 |
| V2 | S2 |
| V3 | S3 |
| V4 | S4 |
| V5 | S5 |

272

| V[m/s] | S |
|---|---|
| V1 | S1 |
| V2 | S1 |
| V3 | S2 |
| V4 | S2 |
| V5 | S2 |

WATERCRAFT, WATERCRAFT INFORMATION SYSTEM, AND INFORMATION COMMUNICATION METHOD OF WATERCRAFT

CROSS REFERENCE TO RELATED APPLICATIONS

This application claims the benefit of priority to Japanese Patent Application No. 2018-072026 filed on Apr. 4, 2018. The entire contents of this application are hereby incorporated herein by reference.

BACKGROUND OF THE INVENTION

1. Field of the Invention

The present invention relates to a watercraft that transmits watercraft information to a remote server, a watercraft information system, and an information communication method of a watercraft.

2. Description of the Related Art

A watercraft information system that transmits watercraft information to a remote server is known in general. Such a watercraft information system is disclosed in Japanese Patent No. 3949414, for example.

Japanese Patent No. 3949414 discloses a watercraft information sharing system that transmits the performance data of a watercraft to a server computer. The watercraft information sharing system includes an engine control unit (hereinafter referred to as an ECU) that collects the performance information of each mechanical component and stores the information as the performance data of the watercraft in a memory, a communication terminal connected to the ECU, a mobile phone connected to a network, and the server computer connected to the mobile phone via the network. The performance data is transferred from the ECU to the communication terminal, and the performance data is transmitted from the communication terminal to the server computer via the mobile phone and a wireless base station. In the server computer, a database in which the performance and the model number of each component are associated with each other is stored. The server computer updates the database based on the received performance data.

In the watercraft information sharing system disclosed in Japanese Patent No. 3949414, the performance data is transmitted from the communication terminal to the server computer via the mobile phone (hereinafter referred to as a "mobile station") and the wireless base station (hereinafter referred to as a "base station"). In a conventional watercraft information sharing system as disclosed in Japanese Patent No. 3949414, performance data is transmitted and received via radio wave communication between a mobile station disposed on a watercraft and a plurality of base stations distributed spatially on the land. Thus, when the mobile station moves to a position away from the land (shore), the strengths of radio waves from the base stations on the land decrease, and when performance data transmission/reception is not established (communication fails), loss or interruption (an increase in error rate) conceivably occurs in the performance data received at the base stations, but there are situations in which it is difficult to significantly reduce or prevent the loss or interruption. Therefore, conventionally, a watercraft information sharing system (watercraft information system) that significantly reduces or prevents a failure in data transmission and an increase in the error rate of data (watercraft information) when data is transmitted from a mobile station (communication terminal) to a base station has been desired.

SUMMARY OF THE INVENTION

Preferred embodiments of the present invention provide watercrafts, watercraft information systems, and information communication methods of watercrafts that significantly reduce or prevent a failure in transmission of watercraft information and an increase in the error rate of the watercraft information when the watercraft information is transmitted from communication terminals to base stations.

A watercraft according to a preferred embodiment of the present invention includes an information acquirer that acquires watercraft information about traveling of the watercraft or a plurality of devices on the watercraft, and a controller configured or programmed to perform data transmission to transmit the watercraft information acquired by the information acquirer to a remote server via a communication terminal that performs mobile communication with a base station. The controller starts the data transmission when a communication start condition based on at least one of a reception strength of a radio wave received by the communication terminal from the base station, a rotation speed of an engine defining one of the plurality of devices, a traveling speed of a hull defining one of the plurality of devices, and a state of a shift device defining one of the plurality of devices is satisfied, and does not start the data transmission when the communication start condition is not satisfied.

In a watercraft according to a preferred embodiment of the present invention, the controller is configured or programmed to start the data transmission when the communication start condition is satisfied, and to not start the data transmission when the communication start condition is not satisfied. Accordingly, the data transmission is not started when the communication start condition is not satisfied, and thus the start of the data transmission is prevented in a state in which transmission of the watercraft information is likely to fail and a state in which the error rate of the watercraft information is likely to increase. For example, when the reception strength of the radio wave from the base station is not sufficiently high and the radio field strength used for data transmission is not maintained at a sufficient magnitude, the start of the data transmission is prevented. Furthermore, in a state in which the shift device is not in the neutral state (a state in which the watercraft is moored, for example), and the rotation speed of the engine or the traveling speed of the hull is relatively high such that there is a high possibility that the watercraft is out of the communication range (cell) of the base station within a period of time during which the data transmission is performed, the start of the data transmission is prevented. Note that this advantageous effect is particularly important in recent years because cells tend to be miniaturized due to high-speed communication. When the communication start condition is satisfied, the watercraft information is appropriately transmitted. Consequently, when the watercraft information is transmitted from the communication terminal to the base station, a failure in transmission of the watercraft information and an increase in the error rate of the watercraft information are significantly reduced or prevented.

In a watercraft according to a preferred embodiment of the present invention, the communication start condition preferably includes a condition that the reception strength is equal to or higher than a receivable strength, and the controller preferably is configured or programmed to start the data transmission when the communication start condition including the condition that the reception strength is equal to or higher than the receivable strength is satisfied, and to not start the data transmission when the communication start condition is not satisfied when the reception strength is lower than the receivable strength. Accordingly, in a state in which the reception strength of the radio wave from the base station is lower than the receivable strength, that is, in a state in which it is difficult to exchange a radio wave between the base station and the communication terminal (transmission and reception of the watercraft information is difficult), the data transmission is not started, and thus a failure in transmission of the watercraft information and an increase in the error rate of the watercraft information are significantly reduced or prevented.

In such a case, the communication start condition preferably includes conditions that the reception strength is equal to or higher than the receivable strength and the rotation speed of the engine is equal to or lower than a start condition rotation speed, and the controller preferably is configured or programmed to start the data transmission when the communication start condition including the conditions that the reception strength is equal to or higher than the receivable strength and the rotation speed of the engine is equal to or lower than the start condition rotation speed is satisfied, and to not start the data transmission when the communication start condition is not satisfied when the reception strength is lower than the receivable strength or the rotation speed of the engine is higher than the start condition rotation speed. Accordingly, not only when the reception strength is lower than the receivable strength but also when the reception strength is equal to or higher than the receivable strength, the start of the data transmission is prevented when the rotation speed of the engine is higher than the start condition rotation speed such that there is a high possibility that the communication terminal is out of the communication range of the base station. Consequently, a failure in transmission of the watercraft information and an increase in the error rate of the watercraft information are further significantly reduced or prevented. In addition, unlike the case in which the communication start condition includes a condition based on the traveling speed (watercraft speed) of the hull, it is not necessary to provide a watercraft speed sensor, and thus the structure of the watercraft is simplified.

In a watercraft that does not start the data transmission when the reception strength is lower than the receivable strength, the communication start condition preferably includes conditions that the reception strength is equal to or higher than the receivable strength and the traveling speed of the hull is equal to or lower than a start condition speed, and the controller preferably is configured or programmed to start the data transmission when the communication start condition including the conditions that the reception strength is equal to or higher than the receivable strength and the traveling speed of the hull is equal to or lower than the start condition speed is satisfied, and to not start the data transmission when the communication start condition is not satisfied when the reception strength is lower than the receivable strength or the traveling speed of the hull is higher than the start condition speed. Accordingly, not only when the reception strength is lower than the receivable strength but also when the reception strength is equal to or higher than the receivable strength, the start of the data transmission is prevented when the traveling speed of the hull is higher than the start condition speed such that there is a high possibility that the communication terminal is out of the communication range of the base station. In addition, as compared with the case in which the communication start condition includes a condition based on the rotation speed of the engine, the communication start condition includes the condition based on the traveling speed of the hull such that the possibility that the communication terminal is out of the communication range of the base station is more accurately estimated. Consequently, a failure in transmission of the watercraft information and an increase in the error rate of the watercraft information are effectively significantly reduced or prevented.

In a watercraft according to a preferred embodiment of the present invention, the controller preferably is configured or programmed to continue the data transmission until the data transmission is completed when a state in which the communication start condition is satisfied is changed to a state in which the communication start condition is not satisfied within a period of time during which the data transmission is performed after the start of the data transmission. In general, it is necessary to continue communication for a predetermined period of time from the start of the data transmission until the completion of the data transmission. When the data transmission is stopped before the data transmission is completed, the error rate of the watercraft information increases, and thus it is necessary to again transmit (retransmit) all pieces of the watercraft information scheduled to be transmitted. On the other hand, according to preferred embodiments of the present invention, even when a state in which the communication start condition is satisfied is changed to a state in which the communication start condition is not satisfied, the data transmission is continued until the data transmission is completed, and thus stopping of the data transmission before the completion of the data transmission is prevented. Consequently, repetitive transmission of the same watercraft information is further significantly reduced or prevented. In the present invention, the term “completion of data transmission” refers to completion of transmission of all pieces of watercraft information scheduled to be transmitted in one data transmission.

In a watercraft according to a preferred embodiment of the present invention, the controller preferably is configured or programmed to start the data transmission when the communication start condition based on a table in which at least two of the reception strength, the rotation speed of the engine, the traveling speed of the hull, and the state of the shift device are associated with each other is satisfied, and to not start the data transmission when the communication start condition is not satisfied. Accordingly, it is determined whether or not the data transmission is started by reference to the communication start condition based on the table prepared in advance. Consequently, as compared with the case in which it is determined whether or not the data transmission is started based on the communication start condition calculated based on the acquired information about the plurality of devices using a relatively complicated calculation formula, a failure in transmission of the watercraft information and an increase in the error rate of the watercraft information are significantly reduced or prevented while the control load on the controller is reduced.

In such a case, the controller preferably is configured or programmed to start the data transmission when the communication start condition based on the table in which the reception strength and the rotation speed of the engine are associated with each other is satisfied, and to not start the data transmission when the communication start condition is not satisfied. Accordingly, it is determined whether or not the data transmission is started based on the communication start condition based on the table such that the data transmission is performed with a reception strength of an appropriate magnitude and a moderate rotation speed of the engine while the load on the controller is reduced.

In a watercraft that starts the data transmission when the communication start condition based on the table is satisfied, the controller preferably is configured or programmed to determine the communication start condition based on the table for a neutral state when the shift device is in the neutral state, and determines the communication start condition based on the table for a traveling state when the shift device is in a state other than the neutral state. When the shift device is in the neutral state, the watercraft is moored at the port (does not travel), for example, and thus the possibility that the watercraft is out of the communication range of the base station is reduced. On the other hand, when the shift device is in a state other than the neutral state, the watercraft is believed to be travelling on the water, and thus as compared with the case in which the shift device is in the neutral state, the possibility that the watercraft is out of the communication range of the base station is increased. In view of this, according to preferred embodiments of the present invention, the table for the neutral state and the table for the traveling state are provided as described above such that an appropriate communication start condition according to the possibility that the watercraft is out of the communication range of the base station is determined. Furthermore, when the shift device is in the neutral state, the communication start condition is set to a less restrictive condition than when the shift device is in a state other than the neutral state, for example, such that excessive restriction (prevention of the start) of the data transmission is significantly reduced or prevented.

A watercraft according to a preferred embodiment of the present invention preferably further includes a switch that switches between a state of connection between a power supply that outputs electric power and the controller and a state of disconnection between the power supply and the controller, and a standby power supply connected to the controller and that outputs electric power, and the controller preferably is configured or programmed to continue the data transmission using the electric power from the standby power supply when the switch switches the state of connection between the power supply and the controller to the state of disconnection between the power supply and the controller within a period of time during which the data transmission is performed after the start of the data transmission. Accordingly, even when the power supply and the controller are switched to the disconnection state within the period of time during which the data transmission is performed, the data transmission is continued using the electric power from the standby power supply. Consequently, stopping of the data transmission due to electric power not being supplied to the controller before the completion of the data transmission is prevented.

In such a case, the standby power supply preferably includes a capacitor. Accordingly, as compared with the case in which the standby power supply is a chemical battery having a relatively large structure, the standby power supply is downsized, and thus an increase in the size of the watercraft is significantly reduced or prevented.

In a watercraft according to a preferred embodiment of the present invention, the controller preferably is configured or programmed to continue the data transmission until the data transmission is completed when the rotation speed of the engine changes from a rotation speed higher than an upper limit of an idling rotation speed range to a rotation speed within the idling rotation speed range within a period of time during which the data transmission is performed after the start of the data transmission, and to not start the next data transmission. When the watercraft stops traveling, conceivably, the rotation speed of the engine is temporarily changed (decreased) from a rotation speed higher than the upper limit of the idling rotation speed range to a rotation speed within the idling rotation speed range, and thereafter driving of the engine is stopped. That is, when the rotation speed of the engine is changed from a rotation speed higher than the upper limit of the idling rotation speed range to a rotation speed within the idling rotation speed range, there is a high possibility that driving of the engine is stopped. In view of this, according to preferred embodiments of the present invention, in a state in which there is a high possibility that driving of the engine is stopped, the data transmission is continued until the data transmission is completed, and the next data transmission is not started such that stopping (interruption) of the data transmission before the completion of the data transmission is prevented. Consequently, repetitive transmission of the same watercraft information is significantly reduced or prevented, and thus an increase in the amount of communication is significantly reduced or prevented.

In a watercraft according to a preferred embodiment of the present invention, the watercraft information preferably includes at least one of drive information of the engine and abnormality information of the plurality of devices. Accordingly, at least one of the drive information of the engine and the abnormality information of the plurality of devices is stored and managed in the remote server, and thus the information managed by the remote server is effectively used by a user, a distributor, or the like.

In such a case, the watercraft information preferably includes the abnormality information of the plurality of devices, and the controller preferably is configured or programmed to determine whether or not the communication start condition is satisfied when acquiring the abnormality information of the plurality of devices, starts the data transmission to transmit the abnormality information of the plurality of devices to the remote server when the communication start condition is satisfied, and to not start the data transmission when the communication start condition is not satisfied. Accordingly, when the abnormality information of the plurality of devices is acquired (when an event occurs), the abnormality information of the plurality of devices is transmitted to the remote server when the communication start condition is satisfied. Consequently, an increase in a period of time from occurrence of abnormality of the plurality of devices to storage of the abnormality information of the plurality of devices in the remote server is significantly reduced or prevented, and thus the user, the distributor, or the like quickly deals with the abnormality of the plurality of devices of the watercraft based on the abnormality information of the devices stored in the remote server.

A watercraft according to a preferred embodiment of the present invention preferably further includes a storage that stores the watercraft information, and the controller preferably is configured or programmed to store the watercraft information in the storage without starting the data transmission when the communication start condition is not satisfied, and to start the data transmission to transmit the watercraft information stored in the storage to the remote server when a state in which the communication start condition is not satisfied is changed to a state in which the communication start condition is satisfied. Accordingly, the watercraft information at the time when the communication start condition is not satisfied is also transmitted to the remote server at the time of subsequent data transmission, and thus the quality of the watercraft information stored and managed by the remote server is improved. Consequently, the watercraft information managed by the remote server is more effectively used by the user, the distributor, or the like.

In a watercraft according to a preferred embodiment of the present invention, the controller preferably is configured or programmed to intermittently perform the data transmission at a first time interval when a first communication start condition of the communication start condition is satisfied, and intermittently perform the data transmission at a second time interval longer than the first time interval when the first communication start condition is not satisfied and a second communication start condition less restrictive than the first communication start condition is satisfied. Accordingly, even when the first communication start condition is not satisfied, the data transmission is intermittently performed at the relatively long second time interval when the second communication start condition is satisfied, and thus the data transmission is performed while the number of times of repetitive transmission of the same watercraft information is reduced.

In a watercraft according to a preferred embodiment of the present invention, the communication terminal is preferably disposed either on an operation seat of the hull or in an outboard motor attached to the hull. Accordingly, the watercraft or the outboard motor alone performs the data transmission without using an external communication terminal (such as a mobile phone of the user), for example.

A watercraft information system according to a preferred embodiment of the present invention includes a watercraft including an information acquirer that acquires watercraft information about traveling of the watercraft or a plurality of devices on the watercraft, a controller that performs data transmission to transmit the watercraft information acquired by the information acquirer via a communication terminal that performs mobile communication with a base station, and a remote server that receives the watercraft information transmitted from the controller via the communication terminal and the base station and stores the watercraft information. The controller starts the data transmission when a communication start condition based on at least one of a reception strength of a radio wave received by the communication terminal from the base station, a rotation speed of an engine defining one of the plurality of devices, a traveling speed of a hull defining one of the plurality of devices, and a state of a shift device defining one of the plurality of devices is satisfied, and does not start the data transmission when the communication start condition is not satisfied.

In a watercraft information system according to a preferred embodiment of the present invention, when the watercraft information is transmitted from the communication terminal to the base station, a failure in transmission of the watercraft information and an increase in the error rate of the watercraft information are significantly reduced or prevented.

An information communication method of a watercraft according to a preferred embodiment of the present invention is an information communication method of a watercraft that transmits watercraft information about traveling of the watercraft or a plurality of devices on the watercraft to a remote server via a communication terminal that performs mobile communication with a base station, and the method includes acquiring the watercraft information, starting data transmission to transmit the acquired watercraft information to the remote server via the communication terminal and the base station when a communication start condition based on at least one of a reception strength of a radio wave received by the communication terminal from the base station, a rotation speed of an engine defining one of the plurality of devices, a traveling speed of a hull defining one of the plurality of devices, and a state of a shift device defining one of the plurality of devices is satisfied, and not starting the data transmission when the communication start condition is not satisfied.

In an information communication method of a watercraft according to a preferred embodiment of the present invention, when the watercraft information is transmitted from the communication terminal to the base station, a failure in transmission of the watercraft information and an increase in the error rate of the watercraft information are significantly reduced or prevented.

In an information communication method of a watercraft according to a preferred embodiment of the present invention, the communication start condition preferably includes a condition that the reception strength is equal to or higher than a receivable strength, and the data transmission is preferably started when the communication start condition including the condition that the reception strength is equal to or higher than the receivable strength is satisfied, and is not preferably started when the communication start condition is not satisfied when the reception strength is lower than the receivable strength. Accordingly, in a state in which the reception strength of the radio wave from the base station is lower than the receivable strength, that is, in a state in which it is difficult to exchange a radio wave between the base station and the communication terminal (transmission and reception of the watercraft information is difficult), the data transmission is not started, and thus a failure in transmission of the watercraft information and an increase in the error rate of the watercraft information are significantly reduced or prevented.

In an information communication method of a watercraft according to a preferred embodiment of the present invention, the data transmission is preferably continued until the data transmission is completed when a state in which the communication start condition is satisfied is changed to a state in which the communication start condition is not satisfied within a period of time during which the data transmission is performed after the start of the data transmission. Accordingly, stopping of the data transmission before the completion of the data transmission is prevented. Consequently, repetitive transmission of the same watercraft information is further significantly reduced or prevented.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a watercraft information system 100 (hereinafter referred to as a "system 100") according to a first preferred embodiment of the present invention is now described with reference to FIGS. 1 to 7.

Figure 1:
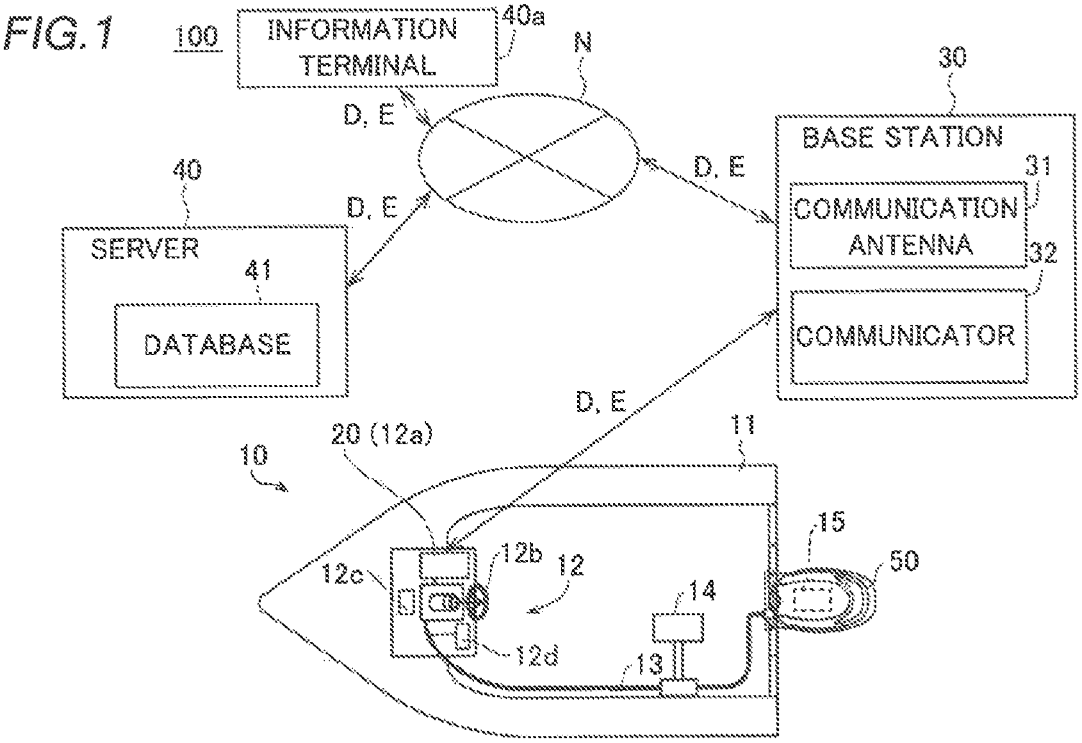
FIG. 1 is a block diagram schematically showing the structure of a watercraft information system according to a first preferred embodiment of the present invention.

As shown in FIG. 1, the system 100 includes a watercraft 10, a communication terminal 20, a base station 30, and a server 40. The system 100 transmits watercraft information D about the watercraft 10 to the server 40 disposed away (remotely) from the watercraft 10 and the base station 30 via the communication terminal 20 and the base station 30, stores the watercraft information D in the server 40, and manages the watercraft information D with the server 40 to enable a user, a manufacturer, a distributor, or the like to use the watercraft information D. For example, the server 40 is accessible via an information terminal 40*a* of the user, the manufacturer, the distributor, or the like. The server 40 is an example of a "remote server".

Figure 2:
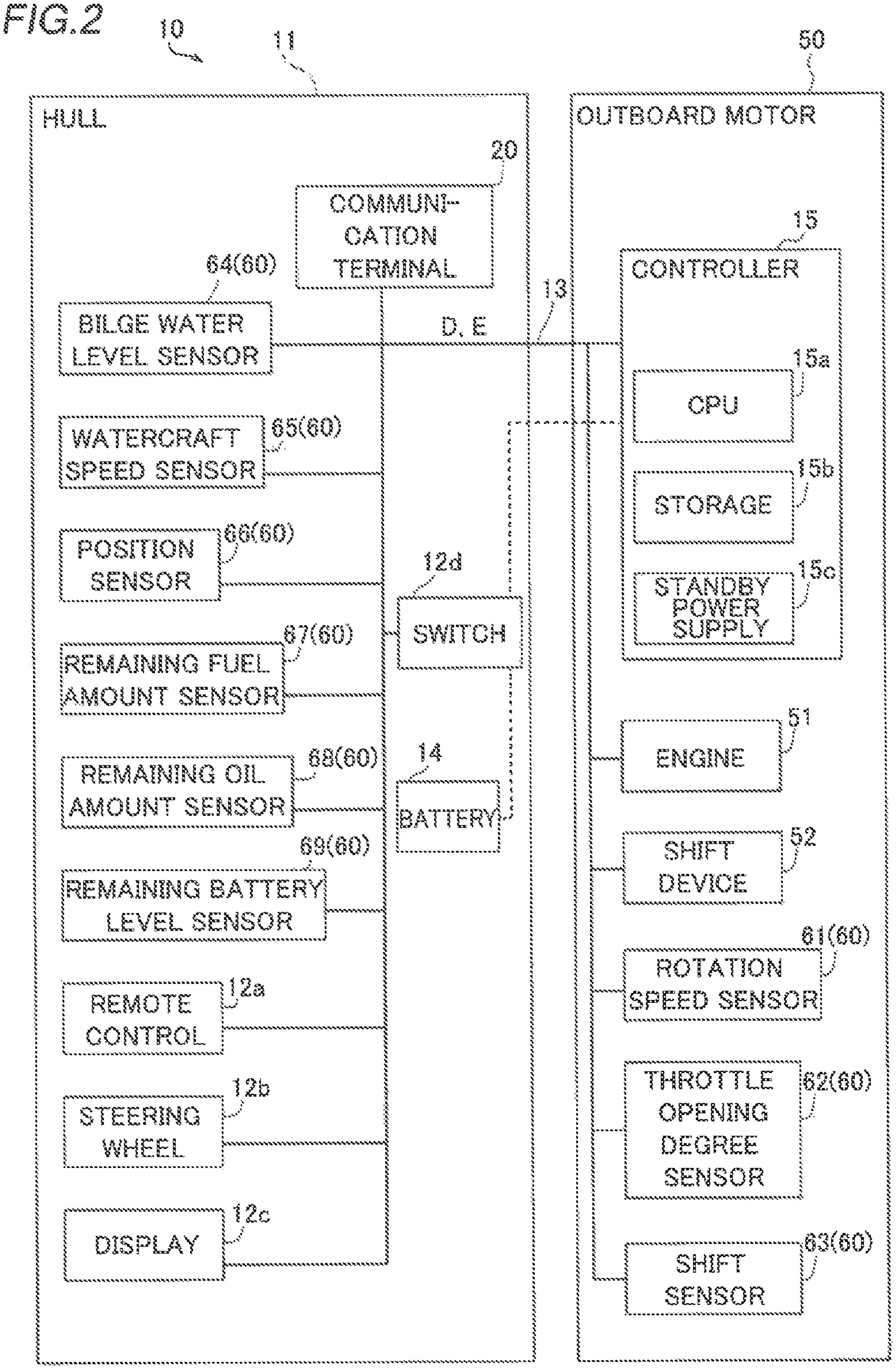
FIG. 2 is a block diagram showing the structure of a watercraft according to the first preferred embodiment of the present invention.

As shown in FIG. 1, the watercraft 10 includes a hull 11, an operation seat 12, a communication line 13, a battery 14, a controller 15, and an outboard motor 50. The outboard motor 50 is attached to a rear portion of the hull 11 so as to be steerable. As shown in FIG. 2, the watercraft 10 includes a plurality of information acquirers 60. The outboard motor 50 includes an engine 51 and a shift device 52. The hull 11, the operation seat 12, the communication line 13, the battery 14, and the outboard motor 50 are examples of a "device". The battery 14 is an example of a "power supply". In the following description, when the hull 11, the operation seat 12, the communication line 13, the battery 14, and the outboard motor 50 (the engine 51 and the shift device 52) are not particularly distinguished from each other, the same are simply described as a "device".

The engine 51 is preferably an internal combustion engine driven by explosive combustion of fuel such as gasoline or light oil. In the engine 51, the amounts of fuel and air to be supplied are adjusted according to the throttle opening degree such that the rotation speed $\omega$ (engine rotation speed) of a crankshaft (not shown) changes. The outboard motor 50 propels the watercraft 10 due to rotation of a propeller (not shown) connected to the engine 51.

The shift device 52 changes the state (position) of a gearing disposed between the engine 51 (drive shaft) and the propeller (propeller shaft) so as to switch between a neutral state (a state in which a rotational force is not transmitted from the engine 51), a forward traveling state, and a rearward traveling state. The forward traveling state and the rearward traveling state are examples of a "state other than neutral".

The outboard motor 50 includes, as the information acquirers 60, a rotation speed sensor 61 that detects the rotation speed $\omega$ of the engine 51, a throttle opening degree sensor 62 that detects the throttle opening degree of the engine 51, and a shift sensor 63 that detects the state (position) of the shift device 52. The hull 11 includes, as the information acquirers 60, a bilge water level sensor 64 that detects the level of water accumulated in the bottom of the hull 11 (bilge water level), and a watercraft speed sensor 65 (GPS (Global Positioning System) sensor, for example) that detects the speed (watercraft speed V) of the hull 11, a position sensor 66 (GPS sensor) that detects the position of the watercraft 10, a remaining fuel amount sensor 67 that detects a remaining amount of fuel, a remaining oil amount sensor 68 that detects a remaining amount of oil, and a remaining battery level sensor 69 that detects a remaining power amount (voltage value) of the battery 14.

The rotation speed $\omega$ of the engine 51, the throttle opening degree of the engine 51, the state of the shift device 52, the bilge water level, the speed (watercraft speed V) of the hull 11, the remaining amount of fuel, the remaining amount of oil, etc. are included in the watercraft information D. The rotation speed $\omega$ and the throttle opening degree of the engine 51 are the drive information of the engine 51. That is, according to the first preferred embodiment, the information acquirers 60 acquire the watercraft information D about traveling of the watercraft or devices of the watercraft 10. In addition, abnormality information E of each device, detection of the abnormal state of the bilge water level (submergence level detection, for example), and detection of the abnormal state of the position sensor 66 (detection of a stolen state, for example), is included in the watercraft information D.

As shown in FIG. 1, the operation seat 12 is disposed on the hull 11, and includes a remote control operator 12*a* (hereinafter referred to as a "remote control 12*a*"), a steering wheel 12*b* that operates the direction (steering direction) of the outboard motor 50, a display 12*c* (gauge, for example) that displays the contents of at least a portion of the watercraft information D, and a switch 12*d* that switches between a state of connection between the battery 14 that outputs electric power and the controller 15 and a state of disconnection between the battery 14 and the controller 15. The remote control 12*a* includes an operator that changes the throttle opening degree of the engine 51 and an operator that switches the state (position) of the shift device 52.

The switch 12*d* is a key switch, for example. The switch 12*d* changes a key orientation, for example, so as to switch between a state (on-state) in which the battery 14 and the controller 15 are connected to each other and a state (off-state) in which the battery 14 and the controller 15 are disconnected from each other, as shown in FIG. 2. The switch 12*d* drives a fuel injector and a starter of the engine 51 in a state in which the battery 14 and the controller 15 are connected to each other so as to switch from the on-state to a state (start state) in which the engine 51 is activated.

The controller 15, the remote control 12*a*, the steering wheel 12*b*, the display 12*c*, the information acquirers 60, and the communication terminal 20 perform wired or wireless communication with each other via the communication line 13. Specifically, the communication line 13 includes a communication line (CAN (Controller Area Network) cable) through which CAN communication is performed and a device (such as a terminal).

The battery 14 is a chemical battery, for example, and supplies electric power to the device (electronic device) of the watercraft 10. For example, the battery 14 supplies electric power to the controller 15 and auxiliary devices (a starter motor and a fuel injection device (FI device)) of the engine 51, for example.

The controller 15 is disposed in the outboard motor 50, for example. The controller 15 performs data transmission to transmit the watercraft information D acquired by the information acquirers 60 via the communication terminal 20 that performs mobile communication with the base station 30. Control processing of the controller 15 is described below in detail. The controller 15 includes a CPU (Central Processing Unit) 15*a*, a storage 15*b*, and a standby power supply 15*c*. The controller 15 is, for example, an ECU (Engine Control Unit) that controls driving of the engine 51.

The CPU 15*a* performs the control processing (arithmetic processing) based on a control program stored in the storage 15*b*. The storage 15*b* is a nonvolatile memory, for example. The storage 15*b* stores the watercraft information D acquired by the information acquirers 60. The storage 15*b* includes a first table 71 (see FIG. 5) and a second table 72 (see FIG. 6) described below. The standby power supply 15*c* is a capacitor, for example. The standby power supply 15*c* is preferably an electric double-layer capacitor (EDLC), the storage capability of which is larger than that of a general capacitor. That is, the standby power supply 15*c* is a supercapacitor (supercondenser) or an ultracapacitor (ultracondenser). The first table 71 is an example of a "table for a traveling state". The second table 72 is an example of a "table for a neutral state".

As shown in FIG. 1, the communication terminal 20 is disposed inside the remote control 12*a* of the operation seat 12, for example. The communication terminal 20 includes an antenna that receives radio waves from the base station 30, and performs mobile communication (cellular communication) with the base station 30. For example, the communication terminal 20 includes a module that performs wireless communication in compliance with predetermined communication standards. For example, the communication terminal 20 is a cellular data communication module (DCM: Data Communication Module) that performs communication in compliance with the "International Mobile Telecommunication 2000 (IMT-2000)" standards (so-called the 3G (3rd Generation) standards) defined by the International Telecommunication Union (ITU), communication in compliance with the LTE (Long Term Evolution) standards, or communication (LTE-Advanced and WirelessMAN-Advanced (WiMAX Release 2), for example) in compliance with the "IMT-Advanced" standards (so-called the 4G (4th Generation) standards). The communication terminal 20 is preferably a communication module that encrypts and transmits the watercraft information D, and performs communication in compliance with the "LTE" standards (especially "LTE category 1"), which are standards suitable for the data size of the watercraft information D and the watercraft speed V. Note that the communication terminal 20 may be a communication module that performs communication in compliance with communication standards, which are earlier or later than the communication standards described above, other than the communication standards described above.

Figure 3:
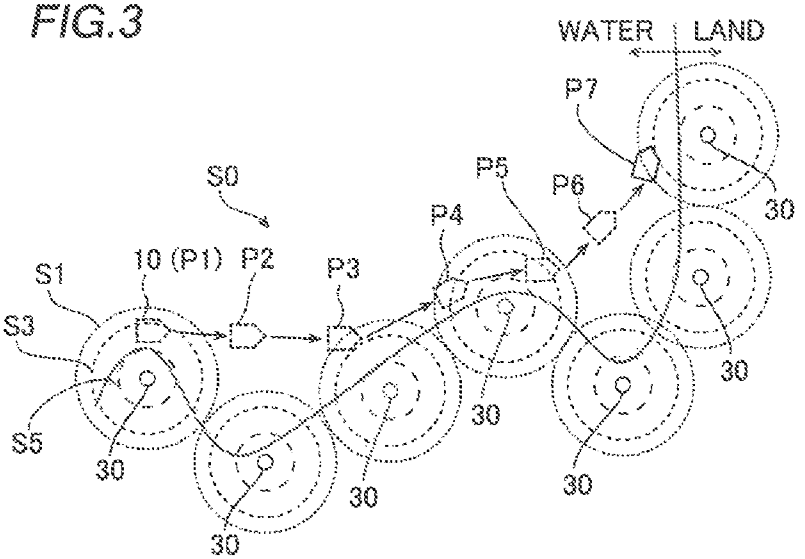
FIG. 3 is a schematic view illustrating the communication ranges of base stations and the strengths of received radio waves according to the first preferred embodiment of the present invention.

As shown in FIG. 3, a plurality of base stations 30 are provided on land. For example, the base stations 30 are scattered at predetermined intervals. The base stations 30 each include a communication antenna 31 (see FIG. 1) and a communicator 32 (see FIG. 1). The communication antenna 31 transmits a radio wave within a predetermined communication range (cell) (several kilometers to several tens of kilometers, for example) and receives the watercraft information D from the communication terminal 20 (mobile station). The strength of the radio wave transmitted from the communication antenna 31 is higher as a distance from the communication antenna 31 is smaller (shorter), and the strength is lower as the distance is larger (longer). As shown in FIG. 1, the communicator 32 is connected to a network N (the Internet, for example), and transmits and receives the watercraft information D to the server 40 via the network N.

As shown in FIG. 1, the server 40 receives the watercraft information D transmitted from the controller 15 via the communication terminal 20 and the base station 30, and stores the watercraft information D. Specifically, the server 40 is connected to the network N, and acquires the watercraft information D via the network N, the base station 30, and the communication terminal 20. The server 40 stores (manages) the watercraft information D about each sold (marketed) watercraft 10 as a database 41. The server 40 updates the database 41 when acquiring the watercraft information D. The information terminal 40*a* of the user, the manufacturer, the distributor, or the like is accessible to the database 41 of the server 40, and in response to a request from the information terminal 40*a*, information is transmitted to the information terminal 40*a*.

Figure 4:
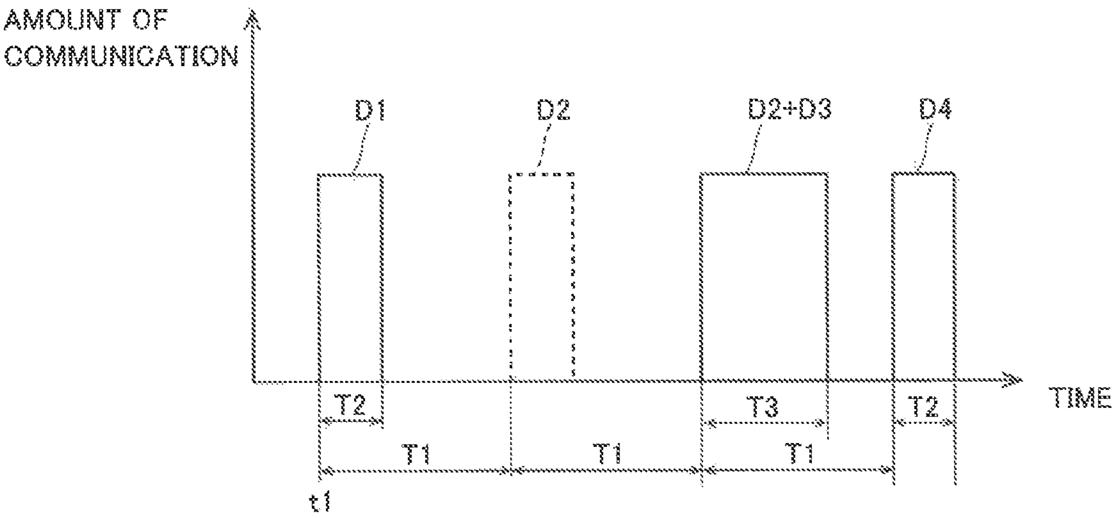
FIG. 4 is a diagram illustrating the start of data transmission according to the first preferred embodiment of the present invention.

As shown in FIGS. 1 and 4, according to the first preferred embodiment, the controller 15 (CPU 15*a*) performs data transmission to transmit the watercraft information D acquired by the information acquirers 60 to the server 40 via the communication terminal 20 that performs mobile communication with the base station 30. As shown in FIG. 4, when the communication start condition C is satisfied, the controller 15 performs a control of starting data transmission at predetermined time intervals T1 (intervals of several minutes or several tens of minutes, for example). A period T2 from the start of data transmission to the completion of data transmission (a period of time during which data transmission is performed) is shorter than each of the time intervals T1 described above. That is, the controller 15 intermittently transmits the watercraft information D. The term "completion of data transmission" refers to completion of transmission of all pieces of watercraft information D scheduled to be transmitted in one data transmission.

Specifically, the controller 15 determines whether or not the communication start condition C is satisfied at the time intervals T1. According to the first preferred embodiment, the controller 15 stores the watercraft information D in the storage 15*b* without starting data transmission when the communication start condition C is not satisfied, and the controller 15 starts data transmission to transmit the watercraft information D stored in the storage 15*b* to the server 40 when a state in which the communication start condition C is not satisfied is changed to a state in which the communication start condition C is satisfied.

For example, FIG. 3 shows an example in which the watercraft 10 travels in the order of positions P1, P2, P3, P4, P5, P6, and P7. It is assumed that the communication start condition C is satisfied at the positions P1, P3, and P4 of the watercraft 10 whereas the communication start condition C is not satisfied at the position P2 of the watercraft 10. In this case, as shown in FIG. 4, the controller 15 determines that the communication start condition C is satisfied at the position P1, and transmits watercraft information D1 at the time when the watercraft 10 is located at the position P1 to the base station (server 40). Then, the controller 15 determines that the communication start condition C is not satisfied at the position P2, and stores watercraft information D2 at the time when the watercraft 10 is located at the position P2 in the storage 15*b*. Then, the controller 15 determines that the communication start condition C is satisfied at the position P3, and retrieves the watercraft information D2 stored in the storage 15*b* in addition to watercraft information D3 at the time when the watercraft 10 is located at the position P3, and transmits both the watercraft information D2 and the watercraft information D3 to the base station 30 (server 40) within a period T3 (a period of time longer than the period T2, for example). Thereafter, the controller 15 transmits watercraft information D4 at the time when the watercraft 10 is located at the position P4 to the base station 30 (server 40).

According to the first preferred embodiment, the controller 15 starts data transmission when the communication start condition C based on at least one of the reception strength S of a radio wave received by the communication terminal 20 from the base station 30, the rotation speed ω of the engine 51, the watercraft speed V that is the traveling speed of the hull 11, and the state of the shift device 52 is satisfied, and the controller 15 does not start data transmission when the communication start condition C is not satisfied.

Specifically, the communication start condition C includes a condition that the reception strength S is equal to or higher than the receivable strength S1. When the communication start condition C including the condition that the reception strength S is equal to or higher than the receivable strength S1 is satisfied, the controller 15 starts data transmission, and when the reception strength S is a reception strength S0 lower than the receivable strength S1 (outside the cell of the base station 30 in FIG. 3), i.e., when the communication start condition C is not satisfied, the controller 15 does not start data transmission. The receivable strength S1 is the lower limit of the strength of a radio wave that is able to be communicated between the communication terminal 20 and the base station 30, for example.

More specifically, the reception strength S is categorized into a plurality of levels. For example, the reception strength S is higher in the order of S0, S1, S2, S3, S4, and S5. That is, the reception strengths S1 to S5 are equal to or higher than the receivable strength S1, and the reception strength S0 is 0 or greater and lower than the receivable strength S1. The reception strength S varies depending on a distance between the communication terminal 20 and the base station 30, obstacles between the communication terminal 20 and the base station 30, etc. For example, the reception strength S increases as the distance between the communication terminal 20 and the base station 30 decreases. Furthermore, the reception strength S decreases as the number of obstacles between the communication terminal 20 and the base station 30 increases.

According to the first preferred embodiment, the communication start condition C includes conditions that the reception strength S is equal to or higher than the receivable strength S1 and the rotation speed ω of the engine 51 is equal to or lower than a start condition rotation speed ω5. When the communication start condition C including the conditions that the reception strength S is equal to or higher than the receivable strength S1 and the rotation speed ω of the engine 51 is equal to or lower than the start condition rotation speed ω5 is satisfied, the controller 15 starts data transmission, and when the reception strength S is the reception strength S0 lower than the receivable strength S1 or the rotation speed ω of the engine 51 is higher than the start condition rotation speed ω, i.e., when the communication start condition C is not satisfied, the controller 15 does not start data transmission.

The start condition rotation speed ω5 is a rotation speed ω lower than the specification upper limit rotation speed ω6 of the engine 51, for example. The specification upper limit rotation speed ω6 is a rotation speed of 10,000 rpm or less, and preferably 6,000 rpm or less, for example. That is, the specification upper limit rotation speed ω6 is the upper limit rotation speed of the engine 51 when the watercraft 10 is an outboard motor boat including the outboard motor 50. The start condition rotation speed ω5 is 5,000 rpm, for example, when the specification upper limit rotation speed ω6 is about 6,000 rpm. In addition, a rotation speed ω1 is 1,000 rpm, a rotation speed ω2 is 2,000 rpm, a rotation speed ω3 is 3,000 rpm, and a rotation speed ω4 is 400 rpm. An idling rotation speed range ωra is the range of the rotation speed ω when the engine 51 is in an idling state, and the upper limit ωa of the idling rotation speed range ωra is a rotation speed of less than 1,000 rpm. In this example, when the rotation speed ω of the engine 51 is higher than the start condition rotation speed ω5 or when the reception strength S is lower than the receivable strength S1, the controller 15 does not start data transmission.

Figures 5, 6, 7:
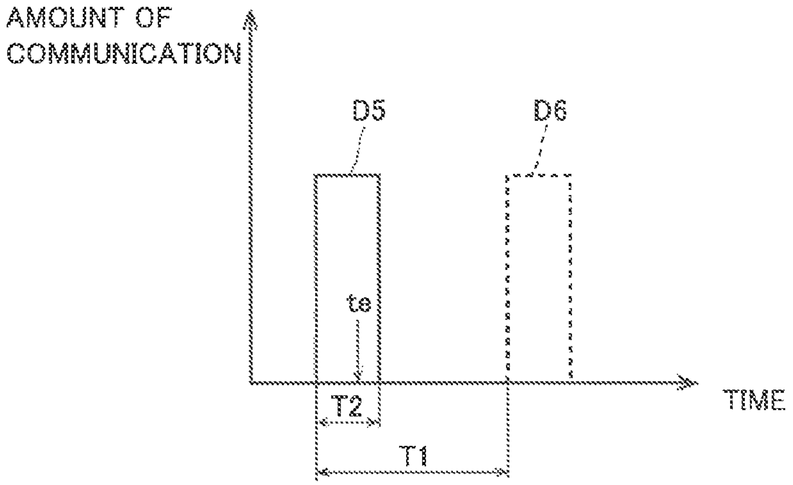
FIG. 5 is a diagram illustrating the configuration of a first table according to the first preferred embodiment of the present invention.
FIG. 6 is a diagram illustrating the configuration of a second table according to the first preferred embodiment of the present invention.
FIG. 7 is a diagram illustrating continuation of data transmission according to the first preferred embodiment of the present invention.

As shown in FIGS. 5 and 6, according to the first preferred embodiment, the controller 15 starts data transmission when the communication start condition C based on the first table 71 or the second table 72 in which at least two of the reception strength S, the rotation speed ω of the engine 51, and the state of the shift device 52 are associated with each other is satisfied, and the controller 15 does not start data transmission when the communication start condition C is not satisfied. That is, the communication start condition C is determined (acquired) by the controller 15 by reference to the first table 71 or the second table 72.

Specifically, according to the first preferred embodiment, the controller 15 starts data transmission when the communication start condition C based on the first table 71 or the second table 72 in which the reception strength S and the rotation speed ω of the engine 51 are associated with each other is satisfied, and the controller 15 does not start data transmission when the communication start condition C is not satisfied.

More specifically, according to the first preferred embodiment, the controller 15 determines the communication start condition C based on the second table 72 for the neutral state shown in FIG. 6 when the shift device 52 is in the neutral state, and the controller 15 determines the communication start condition C based on the first table 71 for the traveling state shown in FIG. 5 when the shift device 52 is in a state (the forward traveling state or the rearward traveling state) other than the neutral state.

As shown in FIG. 5, in the first table 71, the upper limit ωa of the idling rotation speed range ωra of the engine 51 is associated with the receivable strength S1, the rotation speed ω1 is associated with the reception strength S2, the rotation speed ω2 is associated with the reception strength S3, the rotation speed ω3 is associated with the reception strength S4, and the rotation speed ω4 is associated with the reception strength S5. As shown in FIG. 6, in the second table 72, the upper limit ωa of the idling rotation speed range ωra of the engine 51 is associated with the receivable strength S1, the rotation speed ω1 is associated with the receivable strength S1, the rotation speed ω2 is associated with the reception strength S2, the rotation speed ω3 is associated with the reception strength S2, and the rotation speed ω4 is associated with the reception strength S2.

The controller 15 determines the reception strength S that is the communication start condition C corresponding to the rotation speed ω of the engine 51 by reference to the first table 71 or the second table 72.

For example, when the shift device 52 is in a state (forward traveling state) other than the neutral state and the engine 51 is being driven at a rotation speed ω (2,500 rpm, for example) equal to or higher than the rotation speed ω2 and lower than the rotation speed ω3, the controller 15 determines the reception strength S3 as the reception strength S that is the communication start condition C by reference to the first table 71. In this case, the controller 15 determines that the communication start condition C is satisfied when the reception strength S is equal to or higher than the reception strength S3, and determines that the communication start condition C is not satisfied when the reception strength S is lower than the reception strength S3.

In another example, when the shift device 52 is in the neutral state and the engine 51 is being driven at the rotation speed ω within the idling rotation speed range ωra, the controller 15 determines the receivable strength S1 as the reception strength S that is the communication start condition C by reference to the second table 72. In this case, the controller 15 determines that the communication start condition C is satisfied when the reception strength S is equal to or higher than the receivable strength S1, and determines that the communication start condition C is not satisfied when the reception strength S is lower than the receivable strength S1.

As shown in FIG. 7, according to the first preferred embodiment, the controller 15 continues data transmission until the data transmission is completed when a state in which the communication start condition C is satisfied is changed to a state in which the communication start condition C is not satisfied within the period T2 during which the data transmission is performed (at a time te, for example) after the start of the data transmission. Then, after completion of the data transmission, the controller 15 determines that the communication start condition C is not satisfied, and does not start the next data transmission.

For example, as shown in FIG. 3, when the watercraft 10 moves from the position P5 to the position P6, the shift device 52 is in a state (forward traveling state) other than the neutral state, and the engine 51 is being driven at the rotation speed ω (2,500 rpm, for example) equal to or higher than the rotation speed ω2 and lower than the rotation speed ω3 (at the time te, for example), the controller 15 continues data transmission until transmission of watercraft information D5 being transmitted is completed, as shown in FIG. 7, even when the reception strength S changes from the reception strength S3 (a state in which the communication start condition C is satisfied) to the reception strength S2 (a state in which the communication start condition C is not satisfied). Then, the controller 15 does not transmit watercraft information D6 scheduled to be transmitted the next time (after the lapse of the time interval T1) in a state in which the communication start condition C is not satisfied.

According to the first preferred embodiment, the controller 15 continues data transmission, using electric power from the standby power supply 15*c*, when the switch 12*d* switches a state in which the battery 14 and the controller 15 are connected to each other to a state in which the battery 14 and the controller 15 are disconnected from each other within the period T2 during which data transmission is performed (at the time te, for example) after the start of the data transmission. That is, when the user switches the switch 12*d* from the on-state to the off-state within the period T2 during which data transmission is performed (at the time te, for example) after the start of the data transmission, electric power is not supplied from the battery 14 to the controller 15, but electric power is supplied from the standby power supply 15*c* to the controller 15 such that the controller 15 continues the data transmission.

Then, the controller 15 continues the data transmission, using the electric power from the standby power supply 15*c*, and does not transmit the watercraft information D (D6) scheduled to be transmitted the next time (after the lapse of the time interval T1) after completion of the data transmission. Thereafter, the controller 15 stops the control processing by stopping acquisition of the electric power from the standby power supply 15*c*.

According to the first preferred embodiment, when the rotation speed ω of the engine 51 changes from a rotation speed higher than the upper limit ωa of the idling rotation speed range ωra to a rotation speed within the idling rotation speed range ωra within the period T2 during which the data transmission is performed (at the time te, for example) after the start of the data transmission, the controller 15 continues data transmission until the data transmission is completed, and does not start the next data transmission. That is, the controller 15 predicts that driving of the watercraft 10 (outboard motor 50) is stopped by the user, continues the data transmission until the transmission of the watercraft information D (D5) being transmitted is completed, and does not start the next data transmission.

According to the first preferred embodiment, the controller 15 determines whether or not the communication start condition C is satisfied when acquiring the abnormality information E, starts data transmission to transmit the abnormality information E to the server 40 when the communication start condition C is satisfied, and does not start the data transmission when the communication start condition C is not satisfied. That is, the controller 15 determines whether or not the communication start condition C is satisfied based on acquisition of the abnormality information E (occurrence of an event) regardless of the time intervals T1.

Figure 8:
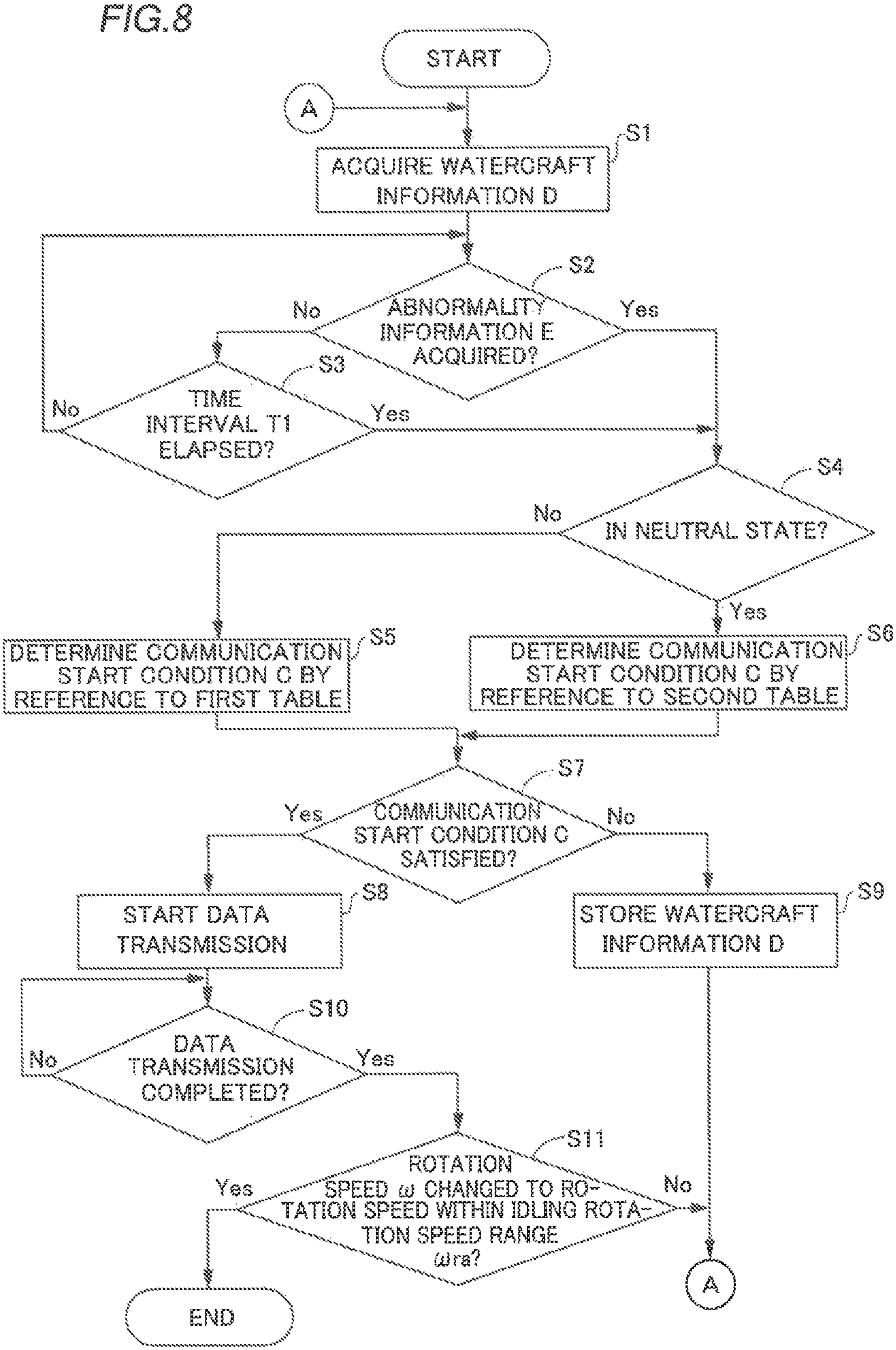
FIG. 8 is a flowchart illustrating control processing of the watercraft according to the first preferred embodiment of the present invention.

An information communication method of the watercraft (watercraft information system 100) according to the first preferred embodiment is now described with reference to FIG. 8. The control processing in the watercraft 10 is performed by the controller 15.

In step S1, at least the watercraft information D of the watercraft information D and the abnormality information E is acquired by the information acquirers 60. Specifically, the watercraft information D is stored in the storage 15*b*. Thereafter, the processing advances to step S2.

In step S2, it is determined whether or not the abnormality information E has been acquired. When the abnormality information E has been acquired, the processing advances to step S4, and when the abnormality information E has not been acquired, the processing advances to step S3.

In step S3, it is determined whether or not the time interval T1 has elapsed from the start time t1 (see FIG. 4) of the previous data transmission. When the time interval T1 has elapsed, the processing advances to step S4, and when the time interval T1 has not elapsed, the processing returns to step S2.

In step S4, it is determined whether or not the shift device 52 is in the neutral state. When the shift device 52 is not in the neutral state (in the forward traveling state or the rearward traveling state), the processing advances to step S5, and when the shift device 52 is in the neutral state, the processing advances to step S6.

In step S5, the communication start condition C is determined by reference to the first table 71. In step S6, the communication start condition C is determined by reference to the second table 72. After step S5 or step S6, the processing advances to step S7.

In step S7, it is determined whether or not the communication start condition C is satisfied. For example, when the communication start condition C determined in step S6 is that the reception strength S is equal to or higher than the receivable strength S1, it is determined whether or not the reception strength S is equal to or higher than the receivable strength S1. When the communication start condition C is satisfied, the processing advances to step S8, and when the communication start condition C is not satisfied, the processing advances to step S9.

In step S8, data transmission is started. That is, data transmission is started such that the watercraft information D is transmitted from the watercraft 10 to the server 40 via the communication terminal 20 that performs mobile communication with the base station 30. When the previous watercraft information D is stored in the storage 15*b*, both the previous watercraft information D and the current watercraft information D are transmitted together. Thereafter, the processing advances to step S10.

In step S9, the watercraft information D is stored in the storage 15*b*. Thereafter, the processing returns to step S1.

In step S10, it is determined whether or not the data transmission is completed. This determination is repeated until the data transmission is completed. When the data transmission is completed, the processing advances to step S11. That is, even when a state in which the communication start condition C is satisfied is changed to a state in which the communication start condition C is not satisfied within the period T2 during which the data transmission is performed, the data transmission is continued until the data transmission is completed.

In step S11, it is determined whether or not the rotation speed ω of the engine 51 has changed from a rotation speed higher than the upper limit ωa of the idling rotation speed range ωra to a rotation speed within the idling rotation speed range ωra within the period T2 during which the data transmission is performed. When the rotation speed ω has changed from a rotation speed higher than the upper limit ωa to a rotation speed within the idling rotation speed range ωra, the information communication control processing in the watercraft 10 is terminated, and when the rotation speed ω has not changed, the processing returns to step S1.

Figure 9:
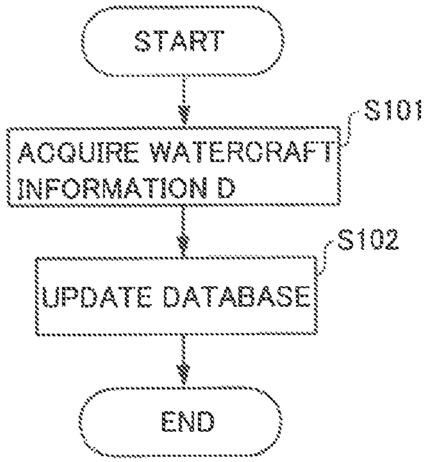
FIG. 9 is a flowchart illustrating control processing of a server according to the first preferred embodiment of the present invention.

As shown in FIG. 9, in the server 40, acquisition (reception) of the watercraft information D is performed in step S101. Then, in step S102, the database 41 is updated based on the watercraft information D.

According to the first preferred embodiment of the present invention, the following advantageous effects are achieved.

According to the first preferred embodiment of the present invention, the controller 15 starts data transmission when the communication start condition C is satisfied, and does not start data transmission when the communication start condition C is not satisfied. Accordingly, data transmission is not started when the communication start condition C is not satisfied, and thus the start of data transmission is prevented in a state in which transmission of the watercraft information D is likely to fail and a state in which the error rate of the watercraft information D is likely to increase. Specifically, when the reception strength S of the radio wave from the base station 30 is not sufficiently high and the radio field strength used for data transmission is not maintained at a sufficient magnitude, the start of data transmission is prevented. Furthermore, in a state in which the shift device 52 is not in the neutral state (a state in which the watercraft 10 is moored, for example), and the rotation speed ω of the engine 51 or the traveling speed of the hull 11 is relatively high such that there is a high possibility that the watercraft 10 is out of the communication range (cell) of the base station 30 within the period T2 during which the data transmission is performed, the start of data transmission is prevented. Note that this advantageous effect is particularly important in recent years as cells tend to be miniaturized due to high-speed communication. When the communication start condition C is satisfied, the watercraft information D is appropriately transmitted. Consequently, when the watercraft information D is transmitted from the communication terminal 20 to the base station 30, a failure in transmission of the watercraft information D and an increase in the error rate of the watercraft information D are significantly reduced or prevented.

According to the first preferred embodiment of the present invention, the communication start condition C includes the condition that the reception strength S is equal to or higher than the receivable strength S1. Furthermore, the controller 15 starts data transmission when the communication start condition C including the condition that the reception strength S is equal to or higher than the receivable strength S1 is satisfied, and does not start data transmission when the communication start condition C is not satisfied when the reception strength S is lower than the receivable strength S1. Accordingly, in a state in which the reception strength S of the radio wave from the base station 30 is lower than the receivable strength S1, that is, in a state in which it is difficult to exchange a radio wave between the base station 30 and the communication terminal 20 (transmission and reception of the watercraft information D is difficult), the data transmission is not started, and thus a failure in transmission of the watercraft information D and an increase in the error rate of the watercraft information D are significantly reduced or prevented.

According to the first preferred embodiment of the present invention, the communication start condition C includes the conditions that the reception strength S is equal to or higher than the receivable strength S1 and the rotation speed ω of the engine 51 is equal to or lower than the start condition rotation speed ω5. Furthermore, the controller 15 starts data transmission when the communication start condition C including the conditions that the reception strength S is equal to or higher than the receivable strength S1 and the rotation speed ω of the engine 51 is equal to or lower than the start condition rotation speed ω5 is satisfied, and does not start data transmission when the communication start condition C is not satisfied when the reception strength S is lower than the receivable strength S1 or the rotation speed ω of the engine 51 is higher than the start condition rotation speed ω5. Accordingly, not only when the reception strength S is lower than the receivable strength S1 but also when the reception strength S is equal to or higher than the receivable strength S1, the start of data transmission is prevented when the rotation speed ω of the engine 51 is higher than the start condition rotation speed ω5 such that there is a high possibility that the communication terminal 20 is out of the communication range of the base station 30. Consequently, a failure in transmission of the watercraft information D and an increase in the error rate of the watercraft information D are further significantly reduced or prevented. In addition, unlike the case in which the communication start condition C includes a condition based on the watercraft speed V, it is not necessary to provide the watercraft speed sensor 65, and thus the complex structure of the watercraft 10 is significantly reduced or prevented.

According to the first preferred embodiment of the present invention, the controller 15 continues data transmission until the data transmission is completed when a state in which the communication start condition C is satisfied is changed to a state in which the communication start condition C is not satisfied within the period T2 during which the data transmission is performed after the start of the data transmission. Accordingly, the data transmission is continued until the data transmission is completed even when a state in which the communication start condition C is satisfied is changed to a state in which the communication start condition C is not satisfied, and thus stopping of the data transmission before the completion of the data transmission is prevented. Consequently, repetitive transmission of the same watercraft information D is further significantly reduced or prevented.

According to the first preferred embodiment of the present invention, the controller 15 starts data transmission when the communication start condition C based on the first table 71 and the second table 72 in which at least two of the reception strength S, the rotation speed ω of the engine 51, the watercraft speed V, and the state of the shift device 52 are associated with each other is satisfied, and does not start data transmission when the communication start condition C is not satisfied. Accordingly, it is determined whether or not data transmission is started by reference to the communication start condition C based on the first table 71 and the second table 72 prepared in advance. Consequently, as compared with the case in which it is determined whether or not data transmission is started based on the communication start condition C calculated based on the acquired information about the plurality of devices using a relatively complicated calculation formula, a failure in transmission of the watercraft information D and an increase in the error rate of the watercraft information D are effectively significantly reduced or prevented while the load on the controller 15 is reduced.

According to the first preferred embodiment of the present invention, the controller 15 starts data transmission when the communication start condition C based on the first table 71 and the second table 72 in which the reception strength S and the rotation speed ω of the engine 51 are associated with each other is satisfied, and does not start data transmission when the communication start condition C is not satisfied. Accordingly, it is determined whether or not data transmission is started based on the communication start condition C based on the first table 71 and the second table 72 such that data transmission is performed with the reception strength S of an appropriate magnitude and the moderate rotation speed ω of the engine 51 while the load on the controller 15 is reduced.

According to the first preferred embodiment of the present invention, the controller 15 determines the communication start condition C based on the second table 72 for the neutral state when the shift device 52 is in the neutral state, and determines the communication start condition C based on the first table 71 for the traveling state when the shift device 52 is in a state other than the neutral state. Accordingly, an appropriate communication start condition C according to the possibility that the watercraft 10 is out of the communication range of the base station 30 is determined. Furthermore, when the shift device 52 is in the neutral state, the communication start condition C is set to a less restrictive condition than when the shift device 52 is in a state other than the neutral state, for example, such that excessive restriction (prevention of the start) of data transmission is significantly reduced or prevented.

According to the first preferred embodiment of the present invention, the watercraft 10 includes the switch **12*d* that switches between a state of connection between the battery 14 that outputs electric power and the controller 15 and a state of disconnection between the battery 14 and the controller 15, and the standby power supply 15*c* connected to the controller 15 and that outputs electric power. Furthermore, the controller 15 continues data transmission using electric power from the standby power supply 15*c* when the switch 12*d* switches the state of connection between the battery 14 and the controller 15 to the state of disconnection between the battery 14 and the controller 15 within the period T2 during which the data transmission is performed after the start of the data transmission. Accordingly, even when the battery 14 and the controller 15 are switched to the disconnection state within the period T2 during which the data transmission is performed, the data transmission is continued using electric power from the standby power supply 15*c*. Consequently, stopping of the data transmission due to electric power not being supplied to the controller 15** before completion of the data transmission is prevented.

According to the first preferred embodiment of the present invention, the standby power supply **15*c* includes a capacitor. Accordingly, as compared with the case in which the standby power supply 15*c* is a chemical battery having a relatively large structure, the standby power supply 15*c* is downsized, and thus an increase in the size of the watercraft 10** is significantly reduced or prevented.

According to the first preferred embodiment of the present invention, the controller 15 continues data transmission until the data transmission is completed when the rotation speed ω of the engine 51 changes from a rotation speed higher than the upper limit ωa of the idling rotation speed range ωra to a rotation speed ω within the idling rotation speed range ωra within the period T2 during which the data transmission is performed after the start of the data transmission, and does not start the next data transmission. Accordingly, in a state in which there is a high possibility that driving of the engine 51 is stopped, data transmission is continued until the data transmission is completed, and the next data transmission is not started such that stopping (interruption) of the data transmission before completion of the data transmission is prevented. Consequently, repetitive transmission of the same watercraft information D is significantly reduced or prevented, and thus an increase in the amount of communication is significantly reduced or prevented.

According to the first preferred embodiment of the present invention, the watercraft information D includes at least one of the drive information of the engine 51 and the abnormality information E of the device. Accordingly, at least one of the drive information of the engine 51 and the abnormality information E of the device is stored and managed in the server 40, and thus the information managed by the server 40 is effectively used by the user, the distributor, or the like.

According to the first preferred embodiment of the present invention, the watercraft information D includes the abnormality information E of the device. Furthermore, the controller 15 determines whether or not the communication start condition C is satisfied when acquiring the abnormality information E of the device, starts data transmission to transmit the abnormality information E of the device to the server 40 when the communication start condition C is satisfied, and does not start the data transmission when the communication start condition C is not satisfied. Accordingly, when the abnormality information E of the device is acquired (when an event occurs), the abnormality information E of the device is transmitted to the server 40 when the communication start condition C is satisfied. Consequently, an increase in a period of time from occurrence of abnormality of the device to storage of the abnormality information E of the device in the server 40 is significantly reduced or prevented, and thus the user, the distributor, or the like quickly deals with the abnormality of the device of the watercraft 10 based on the abnormality information E of the device stored in the server 40.

According to the first preferred embodiment of the present invention, the watercraft 10 includes the storage **15*b* that stores the watercraft information D. Furthermore, the controller 15 stores the watercraft information D in the storage 15*b* without starting data transmission when the communication start condition C is not satisfied, and starts data transmission to transmit the watercraft information D stored in the storage 15*b* to the server 40 when a state in which the communication start condition C is not satisfied is changed to a state in which the communication start condition C is satisfied. Accordingly, the watercraft information D at the time when the communication start condition C is not satisfied is also transmitted to the server 40 at the time of subsequent data transmission, and thus the quality of the watercraft information D stored and managed by the server 40 is improved. Consequently, the watercraft information D managed by the server 40** is more effectively used by the user, the distributor, or the like.

According to the first preferred embodiment of the present invention, the communication terminal 20 is disposed on the operation seat 12 of the hull 11. Accordingly, the watercraft 10 alone performs data transmission without using an external communication terminal (such as a mobile phone of the user), for example.

Second Preferred Embodiment

The structure of a watercraft information system 200 (hereinafter referred to as a "system 200") according to a second preferred embodiment of the present invention is now described with reference to FIGS. 10 to 12. According to the second preferred embodiment, data transmission is not started when a watercraft speed V, which is the traveling speed of a hull 11, is higher than a start condition speed V6. In the second preferred embodiment, the same structures as those of the first preferred embodiment are denoted by the same reference numerals, and description thereof is omitted.

Figure 10:
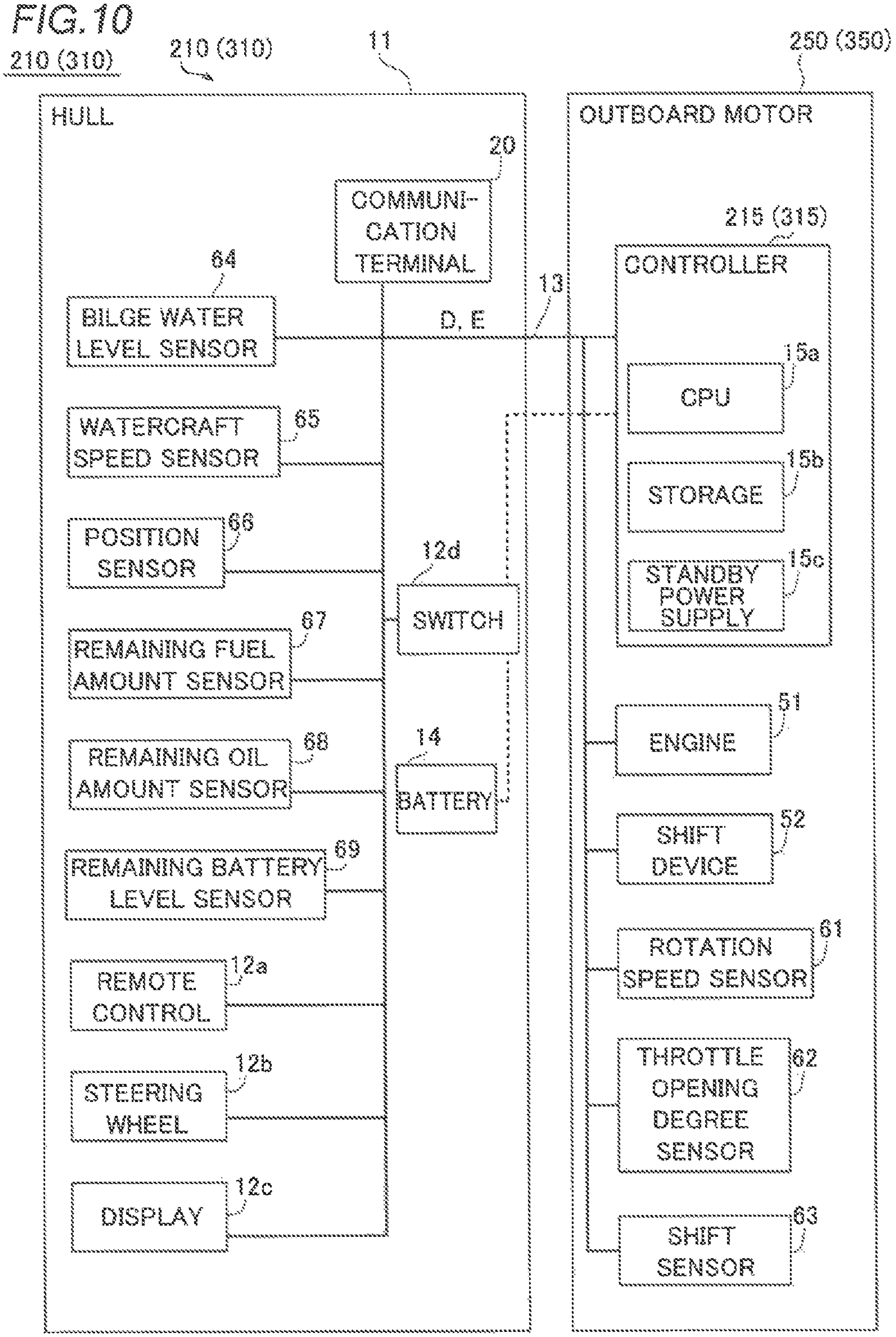
FIG. 10 is a block diagram showing the structure of a watercraft according to a second or third preferred embodiment of the present invention.

As shown in FIG. 10, the system 200 includes a watercraft 210. According to the second preferred embodiment, a communication start condition C1 includes conditions that a reception strength S is equal to or higher than a receivable strength S1 and the watercraft speed V, which is the traveling speed of the hull 11, is equal to or lower than the start condition speed V6. In other words, a controller 215 of the watercraft 210 does not start data transmission when the watercraft speed V, which is the traveling speed of the hull 11 acquired by a watercraft speed sensor 65, is higher than the start condition speed V6 as the communication start condition C1. The watercraft speed V is higher in the order of V1, V2, V3, V4, V5, and V6.

Figures 11, 12, 13:
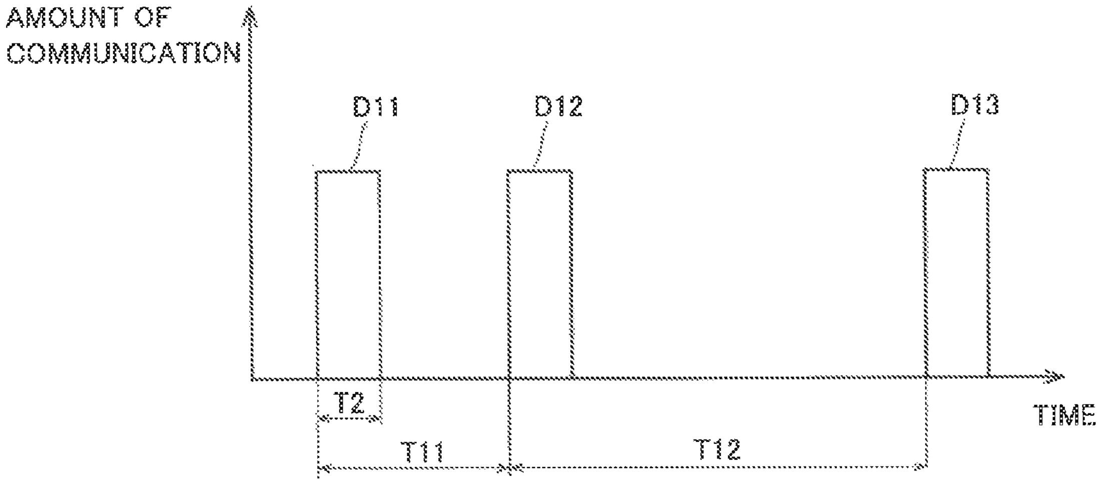
FIG. 11 is a diagram showing the configuration of a first table according to the second preferred embodiment of the present invention.
FIG. 12 is a diagram showing the configuration of a second table according to the second preferred embodiment of the present invention.
FIG. 13 is a diagram illustrating the start of data transmission according to the third preferred embodiment of the present invention.

As shown in FIGS. 11 and 12, the controller 215 includes a first table 271 for a traveling state, in which the reception strength S and the watercraft speed V are associated with each other, and a second table 272 for a neutral state, in which the reception strength S and the watercraft speed V are associated with each other. The controller 215 determines the communication start condition C1 by reference to the first table 271 or the second table 272, starts data transmission when the reception strength S satisfies the determined communication start condition C1, and does not start data transmission when the reception strength S does not satisfy the determined communication start condition C1.

Specifically, as shown in FIG. 11, in the first table 271, the watercraft speed V1 is associated with the receivable strength S1, the watercraft speed V2 is associated with the reception strength S2, the watercraft speed V3 is associated with the reception strength S3, the watercraft speed V4 is associated with the reception strength S4, and the watercraft speed V5 is associated with the reception strength S5. As shown in FIG. 12, in the second table 272, the watercraft speed V1 is associated with the receivable strength S1, the watercraft speed V2 is associated with the receivable strength S1, the watercraft speed V3 is associated with the reception strength S2, the watercraft speed V4 is associated with the reception strength S2, and the watercraft speed V5 is associated with the reception strength S2. The remaining structures and a control method of the second preferred embodiment are similar to those of the first preferred embodiment.

According to the second preferred embodiment of the present invention, the following advantageous effects are achieved.

According to the second preferred embodiment of the present invention, the communication start condition C1 includes the conditions that the reception strength S is equal to or higher than the receivable strength S1 and the watercraft speed V is equal to or lower than the start condition speed V6. Furthermore, the controller 215 starts data transmission when the communication start condition C1 including the conditions that the reception strength S is equal to or higher than the receivable strength S1 and the watercraft speed V is equal to or lower than the start condition speed V6 is satisfied, and does not start data transmission when the communication start condition C1 is not satisfied when the reception strength S is lower than the receivable strength S1 or the watercraft speed V, which is the traveling speed of the hull 11, is higher than the start condition speed V6. Accordingly, not only when the reception strength S is lower than the receivable strength S1 but also when the reception strength S is equal to or higher than the receivable strength S1, the start of data transmission is prevented when the watercraft speed V is higher than the start condition speed V6 such that there is a high possibility that the communication terminal 20 is out of the communication range of the base station 30. In addition, as compared with the case in which the communication start condition C1 includes a condition based on the rotation speed ω of the engine 51, the communication start condition C1 includes the condition based on the watercraft speed V such that the possibility that the communication terminal 20 is out of the communication range of the base station 30 is more accurately estimated. Consequently, a failure in transmission of the watercraft information and an increase of the error rate of the watercraft information are effectively significantly reduced or prevented. The remaining advantageous effects of the second preferred embodiment are similar to those of the first preferred embodiment.

Third Preferred Embodiment

The structure of a watercraft information system 300 (hereinafter referred to as a "system 300") according to a third preferred embodiment of the present invention is now described with reference to FIGS. 10 and 13. According to the third preferred embodiment, a controller 315 changes a time interval (a time point at which it is determined whether or not a communication start condition is satisfied) at which data transmission is performed. In the third preferred embodiment, the same structures as those of the first preferred embodiment are denoted by the same reference numerals, and description thereof is omitted.

As shown in FIG. 10, the system 300 according to the third preferred embodiment includes a watercraft 310. The controller 315 of the watercraft 310 intermittently performs data transmission at time intervals T11 when a first communication start condition C21 is satisfied, and intermittently performs data transmission at time intervals T12 longer than the time intervals T11 when the first communication start condition C21 is not satisfied and a second communication start condition C22, which is a condition less restrictive than the first communication start condition C21, is satisfied.

For example, when the first communication start condition C21 is that the reception strength S is equal to or higher than the reception strength S3, the second communication start condition C22 is that the reception strength S is equal to or higher than the reception strength S2. As shown in FIG. 13, the controller 315 intermittently performs data transmission at the time intervals T11 when the reception strength S is equal to or higher than the reception strength S3, but intermittently performs data transmission at the time intervals T12 when the reception strength S is the reception strength S2. The remaining structures and a control method of the third preferred embodiment are similar to those of the first preferred embodiment.

According to the third preferred embodiment of the present invention, the following advantageous effects are achieved.

According to the third preferred embodiment of the present invention, the controller 315 intermittently performs data transmission at the time intervals T11 when the first communication start condition C21 is satisfied, and intermittently performs data transmission at the time intervals T12 longer than the time intervals T11 when the first communication start condition C21 is not satisfied and the second communication start condition C22 less restrictive than the first communication start condition C21 is satisfied. Accordingly, even when the first communication start condition C21 is not satisfied, data transmission is intermittently performed at the relatively long time intervals T12 when the second communication start condition C22 is satisfied, and thus data transmission is performed while the number of times of repetitive transmission of the same watercraft information D is reduced. The remaining advantageous effects of the third preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

Figure 14:
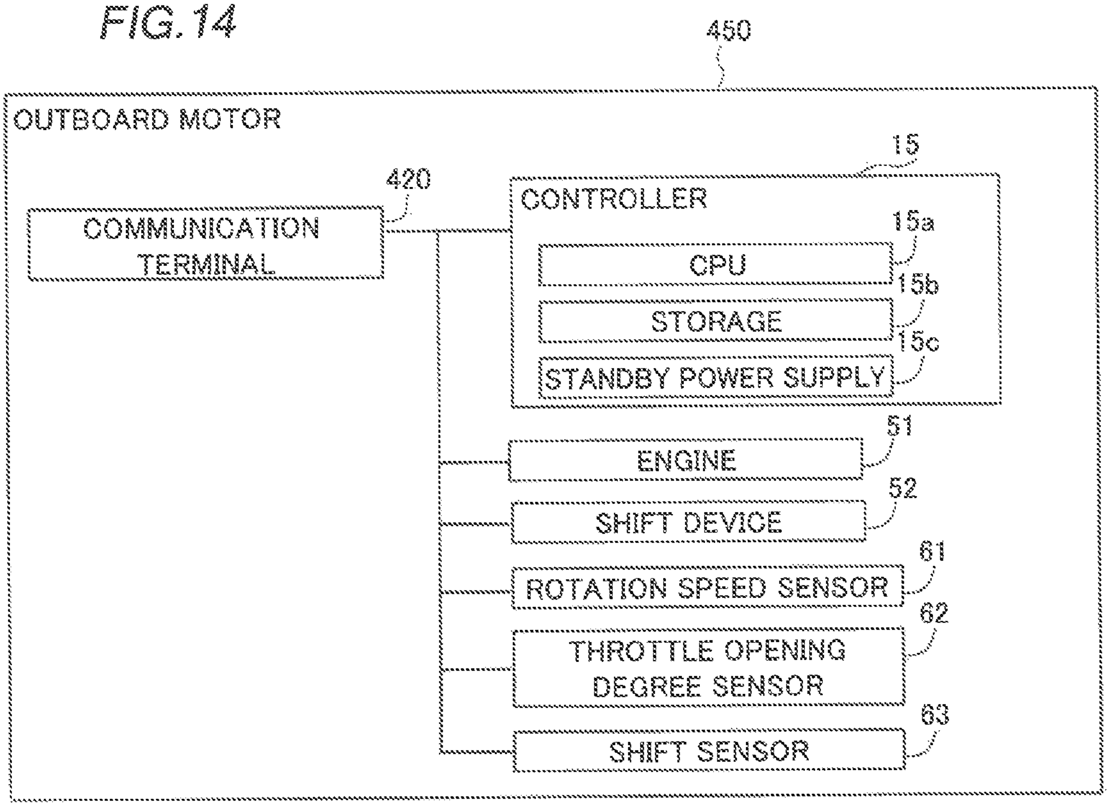
FIG. 14 is a block diagram showing the structure of an outboard motor according to a first modification of the first to third preferred embodiments of the present invention.

For example, while the communication terminal is preferably disposed on the operation seat of the hull in each of the first to third preferred embodiments described above, the present invention is not restricted to this. For example, the communication terminal may alternatively be disposed on a portion of the hull other than the operation seat, or as in an outboard motor 450 according to a first modification shown in FIG. 14, a communication terminal 420 may alternatively be disposed inside the outboard motor 450.

Figure 15:
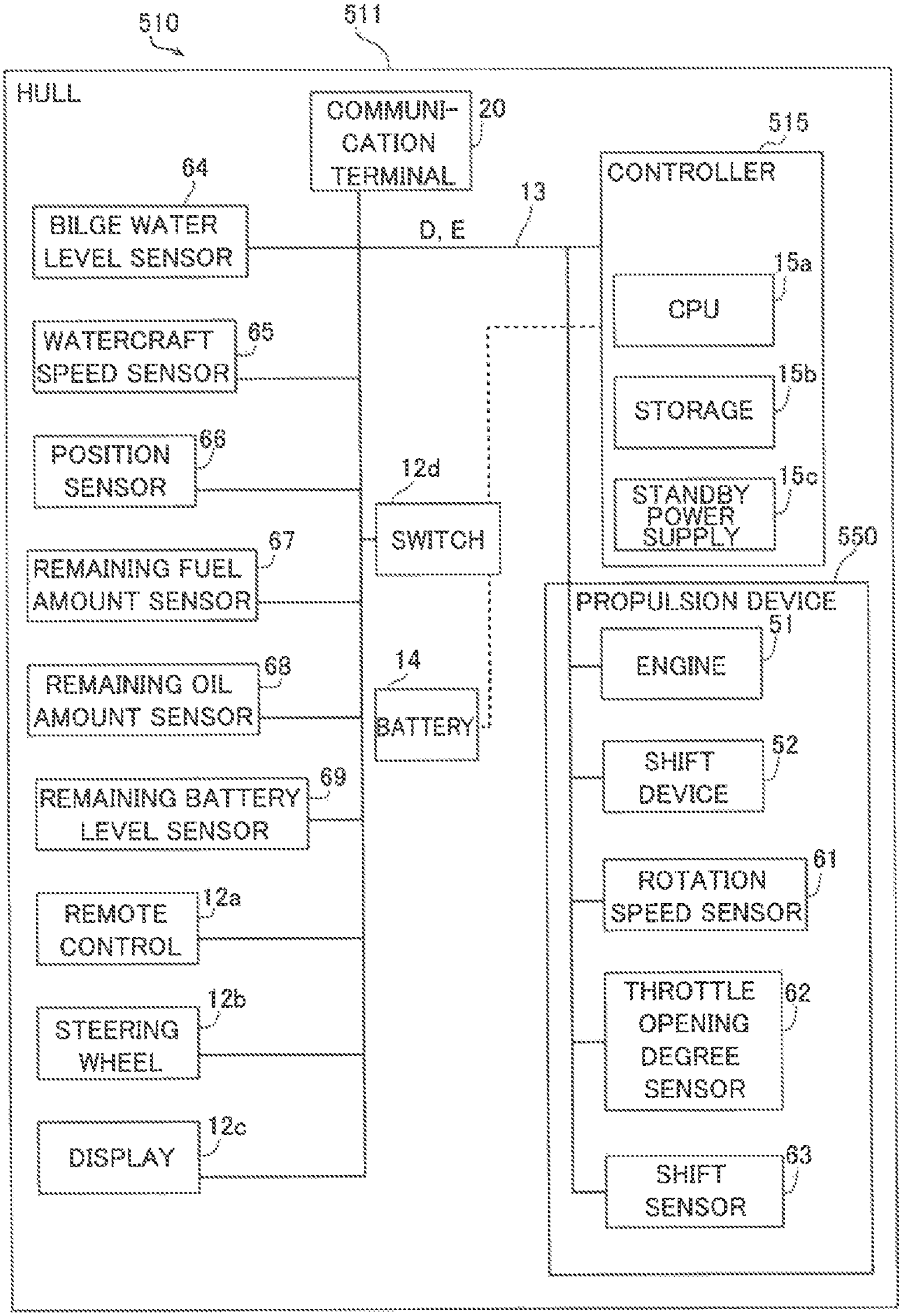
FIG. 15 is a block diagram showing the structure of a watercraft according to a second modification of the first to third preferred embodiments of the present invention.

While the watercraft is preferably an outboard motor boat including an outboard motor in each of the first to third preferred embodiments described above, the present invention is not restricted to this. For example, as in a watercraft 510 according to a second modification shown in FIG. 15, a propulsion device 550 may alternatively be attached inside a hull 511, and a controller 515 provided in the hull 511 may alternatively control an engine 51 of the propulsion device 550.

Figure 16:
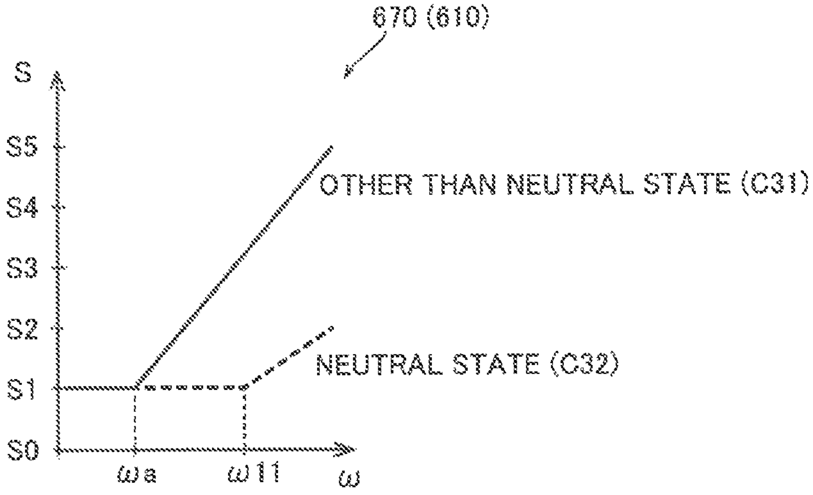
FIG. 16 is a diagram showing the configuration of a map of a watercraft according to a third modification of the first to third preferred embodiments of the present invention.

While the communication start condition is preferably determined by reference to the first table and the second table in each of the first to third preferred embodiments described above, the present invention is not restricted to this. For example, as in a watercraft 610 according to a third modification shown in FIG. 16, the communication start condition may alternatively be determined by reference to a map 670 (multidimensional map) including a graph (solid line) showing a communication start condition C31 to be referred to in a state other than the neutral state and a graph (dotted line) showing a communication start condition C32 to be referred to in the neutral state. For example, when the rotation speed ω of the engine 51 is equal to or lower than the upper limit ωa of a map idling rotation speed range, both the communication start conditions C31 and C32 are communication start conditions that the reception strength S is equal to or higher than the reception strength S1. In the map 670, when the rotation speed ω of the engine 51 is higher than the upper limit ωa and equal to or lower than ω11, in the communication start condition C31, the magnitude of the reception strength S that is the communication start condition gradually increases, but in the communication start condition C32, the magnitude of the reception strength S that is the communication start condition is constant at S1. Furthermore, in the map 670, when the rotation speed ω of the engine 51 is higher than ω11, in both the communication start conditions C31 and C32, the magnitude of the reception strength S that is the communication start condition gradually increases.

While the communication start condition preferably includes the reception strength, the state of the shift device, and the rotation speed in each of the first and third preferred embodiments described above, and the communication start condition preferably includes the reception strength, the state of the shift device, and the watercraft speed in the second preferred embodiment described above, the present invention is not restricted to this. That is, the communication start condition may alternatively include at least one of the reception strength, the state of the shift device, the rotation speed, and the watercraft speed.

While the communication terminal is preferably a dedicated item to be provided on the hull in each of the first to third preferred embodiments described above, the present invention is not restricted to this. For example, the watercraft information may alternatively be transmitted from the controller to the base station and the server via a communication terminal (such as a mobile phone) held by the user.

While the standby power supply is preferably an electric double-layer capacitor in each of the first to third preferred embodiments described above, the present invention is not restricted to this. An electric double-layer capacitor is easier to downsize as compared with a chemical battery, and is preferable from the viewpoint of mounting, but when there is no problem in increasing the size of the standby power supply, the standby power supply may be a chemical battery.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft comprising:

an information acquirer that acquires watercraft information about traveling of the watercraft or a plurality of devices on the watercraft; and a controller configured or programmed to perform data transmission to transmit the watercraft information acquired by the information acquirer to a remote server via a communication terminal that performs mobile communication with a base station;

wherein the controller is configured or programmed to start the data transmission when a communication start condition based on a reception strength of a radio wave received by the communication terminal from the base station and at least one of a rotation speed of an engine defining one of the plurality of devices, a traveling speed of a hull defining one of the plurality of devices, and a state of a shift device defining one of the plurality of devices is satisfied, and to not start the data transmission when the communication start condition is not satisfied.

2. The watercraft according to claim 1, wherein the communication start condition includes a condition that the reception strength is equal to or higher than a receivable strength; and the controller is configured or programmed to start the data transmission when the communication start condition including the condition that the reception strength is equal to or higher than the receivable strength is satisfied, and to not start the data transmission when the communication start condition is not satisfied when the reception strength is lower than the receivable strength.

3. The watercraft according to claim 2, wherein the communication start condition includes conditions that the reception strength is equal to or higher than the receivable strength and the rotation speed of the engine is equal to or lower than a start condition rotation speed; and the controller is configured or programmed to start the data transmission when the communication start condition including the conditions that the reception strength is equal to or higher than the receivable strength and the rotation speed of the engine is equal to or lower than the start condition rotation speed is satisfied, and to not start the data transmission when the communication start condition is not satisfied such when the reception strength is lower than the receivable strength or the rotation speed of the engine is higher than the start condition rotation speed.

4. The watercraft according to claim 2, wherein the communication start condition includes conditions that the reception strength is equal to or higher than the receivable strength and the traveling speed of the hull is equal to or lower than a start condition speed; and the controller is configured or programmed to start the data transmission when the communication start condition including the conditions that the reception strength is equal to or higher than the receivable strength and the traveling speed of the hull is equal to or lower than the start condition speed is satisfied, and to not start the data transmission when the communication start condition is not satisfied when the reception strength is lower than the receivable strength or the traveling speed of the hull is higher than the start condition speed.

5. The watercraft according to claim 1, wherein the controller is configured or programmed to start the data transmission when the communication start condition based on a table in which at least two of the reception strength, the rotation speed of the engine, the traveling speed of the hull, and the state of the shift device are associated with each other is satisfied, and to not start the data transmission when the communication start condition is not satisfied.

6. The watercraft according to claim 5, wherein the controller is configured or programmed to start the data transmission when the communication start condition based on the table in which the reception strength and the rotation speed of the engine are associated with each other is satisfied, and to not start the data transmission when the communication start condition is not satisfied.

7. The watercraft according to claim 5, wherein the controller is configured or programmed to determine the communication start condition based on the table in which the state of the shift device is the neutral state, and determines the communication start condition based on the table in which the state of the shift device is in a state other than the neutral state.

8. The watercraft according to claim 1, further comprising:

a switch that switches between a state of connection between a power supply that outputs electric power and the controller and a state of disconnection between the power supply and the controller; and a standby power supply connected to the controller and that outputs electric power; wherein the controller is configured or programmed to continue the data transmission using the electric power from the standby power supply when the switch switches the state of connection between the power supply and the controller to the state of disconnection between the power supply and the controller within a period of time during which the data transmission is performed after the start of the data transmission.

9. The watercraft according to claim 8, wherein the standby power supply includes a capacitor.

10. The watercraft according to claim 1, wherein the controller is configured or programmed to continue the data transmission until the data transmission is completed when the rotation speed of the engine changes from a rotation speed higher than an upper limit of an idling rotation speed range to a rotation speed within the idling rotation speed range within a period of time during which the data transmission is performed after the start of the data transmission, and to not start a next data transmission.

11. The watercraft according to claim 1, wherein the watercraft information includes at least one of drive information of the engine and abnormality information of the plurality of devices.

12. The watercraft according to claim 11, wherein the watercraft information includes the abnormality information of the plurality of devices; and the controller is configured or programmed to determine whether or not the communication start condition is satisfied when acquiring the abnormality information of the plurality of devices, to start the data transmission to transmit the abnormality information of the plurality of devices to the remote server when the communication start condition is satisfied, and to not start the data transmission when the communication start condition is not satisfied.

13. The watercraft according to claim 1, further comprising a storage that stores the watercraft information; wherein the controller is configured or programmed to store the watercraft information in the storage without starting the data transmission when the communication start condition is not satisfied, and to start the data transmission to transmit the watercraft information stored in the storage to the remote server when a state in which the communication start condition is not satisfied is changed to a state in which the communication start condition is satisfied.

14. The watercraft according to claim 1, wherein the controller is configured or programmed to intermittently perform the data transmission at a first time interval when a first communication start condition of the communication start condition is satisfied, and intermittently perform the data transmission at a second time interval longer than the first time interval when the first communication start condition is not satisfied and a second communication start condition less restrictive than the first communication start condition is satisfied.

15. The watercraft according to claim 1, wherein the communication terminal is disposed either on an operation seat of the hull or in an outboard motor attached to the hull.

16. The watercraft according to claim 1, wherein the controller is configured or programmed to start the data transmission at a predetermined time interval when the communication start condition is satisfied.

17. A watercraft information system comprising:

a watercraft including an information acquirer that acquires watercraft information about traveling of the watercraft or a plurality of devices on the watercraft, and a controller configured or programmed to perform data transmission to transmit the watercraft information acquired by the information acquirer via a communication terminal that performs mobile communication with a base station; and a remote server that receives the watercraft information transmitted from the controller via the communication terminal and the base station and stores the watercraft information; wherein the controller is configured or programmed to start the data transmission when a communication start condition based on a reception strength of a radio wave received by the communication terminal from the base station and at least one of a rotation speed of an engine defining one of the plurality of devices, a traveling speed of a hull defining one of the plurality of devices, and a state of a shift device defining one of the plurality of devices is satisfied, and to not start the data transmission when the communication start condition is not satisfied.

18. An information communication method of a watercraft that transmits watercraft information about traveling of the watercraft or a plurality of devices on the watercraft to a remote server via a communication terminal that performs mobile communication with a base station, the method comprising:

acquiring the watercraft information; and starting data transmission to transmit the acquired watercraft information to the remote server via the communication terminal and the base station when a communication start condition based on a reception strength of a radio wave received by the communication terminal from the base station and at least one of a rotation speed of an engine defining one of the plurality of devices, a traveling speed of a hull defining one of the plurality of devices, and a state of a shift device defining one of the plurality of devices is satisfied, and not starting the data transmission when the communication start condition is not satisfied.

19. The information communication method of the watercraft according to claim 18, wherein the communication start condition includes a condition that the reception strength is equal to or higher than a receivable strength; and the data transmission is started when the communication start condition including the condition that the reception strength is equal to or higher than the receivable strength is satisfied, and is not started when the communication start condition is not satisfied when the reception strength is lower than the receivable strength.

20. A watercraft comprising:

an information acquirer that acquires watercraft information about traveling of the watercraft or a plurality of devices on the watercraft; and a controller configured or programmed to perform data transmission to transmit the watercraft information acquired by the information acquirer to a remote server via a communication terminal that performs mobile communication with a base station;

wherein the controller is configured or programmed to start the data transmission when a communication start condition based on at least one of a reception strength of a radio wave received by the communication terminal from the base station, a rotation speed of an engine defining one of the plurality of devices, a traveling speed of a hull defining one of the plurality of devices, and a state of a shift device defining one of the plurality of devices is satisfied, and to not start the data transmission when the communication start condition is not satisfied; and the controller is configured or programmed to start the data transmission when the communication start condition based on a table in which at least two of the reception strength, the rotation speed of the engine, the traveling speed of the hull, and the state of the shift device are associated with each other is satisfied, and to not start the data transmission when the communication start condition is not satisfied.

* * * * *